United States Patent
Zhou et al.

(10) Patent No.: US 10,939,048 B1
(45) Date of Patent: Mar. 2, 2021

(54) METHOD AND CAMERA FOR AUTOMATIC GAIN ADJUSTMENT BASED ON ILLUMINANCE OF VIDEO CONTENT

(71) Applicant: Shenzhen Baichuan Security Technology Co., Ltd., Shenzhen (CN)

(72) Inventors: Rui Zhou, Shenzhen (CN); Xiaoyu Liu, Shenzhen (CN)

(73) Assignee: Shenzhen Baichuan Security Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/941,569

(22) Filed: Jul. 29, 2020

(30) Foreign Application Priority Data

Mar. 13, 2020 (CN) .......................... 202010175587.5

(51) Int. Cl.
*H04N 5/235* (2006.01)
*H04N 19/62* (2014.01)

(52) U.S. Cl.
CPC ......... *H04N 5/2352* (2013.01); *H04N 5/2351* (2013.01); *H04N 19/62* (2014.11)

(58) Field of Classification Search
CPC .... H04N 5/2352; H04N 19/62; H04N 5/2351; H04N 5/2356
See application file for complete search history.

(56) References Cited

U.S. PATENT DOCUMENTS

| | | | | |
|---|---|---|---|---|
| 7,750,945 | B2* | 7/2010 | Serizawa | H04N 5/232 348/221.1 |
| 9,148,584 | B1* | 9/2015 | Linzer | H04N 5/2352 |
| 2008/0049119 | A1* | 2/2008 | Yamamoto | H04N 5/772 348/223.1 |
| 2008/0252743 | A1* | 10/2008 | Ueda | H04N 5/23218 348/222.1 |
| 2009/0016625 | A1* | 1/2009 | Kim | H04N 5/243 382/238 |
| 2011/0007186 | A1* | 1/2011 | Yonaha | H04N 5/2352 348/239 |
| 2012/0188414 | A1* | 7/2012 | Ross | H04N 5/357 348/241 |
| 2015/0085943 | A1* | 3/2015 | Taniguchi | H04N 5/145 375/240.29 |
| 2019/0246028 | A1* | 8/2019 | Osawa | H04N 5/35563 |

\* cited by examiner

*Primary Examiner* — Jason A Flohre
(74) *Attorney, Agent, or Firm* — Idea Intellectual Limited; Margaret A. Burke; Sam T. Yip

(57) ABSTRACT

A method for automatic gain adjustment based on illuminance of video content and a camera are provided. The method includes arranging a first gain value for an image sensor according to a list of preset gain values; obtaining frequency domain data using frequency domain transformation on illuminance components of the image; setting a constant percentage value and summing up the percentage of the frequency domain data accumulated from the highest signal amplitude to obtain a first high frequency information cumulative value; repeating above steps according to a preset gain value arrangement order to obtain a number of high frequency information cumulative values; and using the gain value corresponding to a maximum high frequency information cumulative value in gain adjustment for the image sensor.

8 Claims, 3 Drawing Sheets

METHOD AND CAMERA FOR AUTOMATIC GAIN ADJUSTMENT BASED ON ILLUMINANCE OF VIDEO CONTENT

CROSS-REFERENCES TO RELATED APPLICATIONS

This application claims priority to the Chinese patent application No. 202010175587.5 filed on Mar. 13, 2020, and the disclosure of which is incorporated herein by reference in its entirety.

FIELD OF THE INVENTION

The invention relates to the field of camera, in particular to a method and a camera for automatic gain adjustment based on illuminance of video content.

BACKGROUND OF THE INVENTION

Exposure of image sensor is determined by three factors: aperture, exposure time and gain. When capturing a video, the aperture is usually fixed and the exposure time that is limited by a frame rate is usually relatively fixed, and in general the only parameter which is flexibly adjustable is the gain. When a target picture is small or taken in the presence of a very bright local area, such as backlit, night scene, or other scenes, the image quality is often unsatisfactory. At present, mainstream methods for gain adjustment of illuminance include illuminance averaging method, illuminance weighting method, and illuminance histogram method. The illuminance averaging method is to calculate gain according to average illuminance of the whole picture. The illuminance weighting method demarcates regions of interest for a user via an interactive approach and increases weighting-factors of the regions of interest, so as to obtain a better exposure effect. However, manual participation by the user is required for such approach, and hence the operation is relatively complex. The illuminance histogram method is proceeded by calculating illuminance distribution histogram of an exposed image in combination with determination of a threshold value, such that issue of overexposure or underexposure can be effectively prevented. However, such method cannot apply accurate exposure with respect to regions of interest for a user.

SUMMARY OF THE INVENTION

With respect to the afore-described disadvantages of mainstream methods for gain adjustment of illuminance, the present invention provides a method and a camera for automatic gain adjustment based on illuminance of video content, which can automatically adjust video gain parameters of regions of interest for a user, thereby obtaining better exposure effect.

According to a first aspect of the present invention, a method for automatic gain adjustment based on illuminance of video content is provided and applied to a camera, which includes steps as follows.

Step one: setting a first gain value for an image sensor according to a list of preset gain values;

Step two: capturing an image under condition of the first gain value and performing frequency domain transformation on illuminance components of the image to obtain a frequency domain data distribution;

Step three: setting a constant percentage and calculating a cumulative sum of the percentage of frequency domain data accumulated from the highest signal amplitude in the frequency domain data distribution, so as to obtain a first high frequency information cumulative value;

Step four: selecting other gain values one by one from the list of preset gain values according to an arrangement order of the list of preset gain values, and repeating step one to step three until all the gain values in the list of preset gain values are exhausted, so as to obtain high frequency information cumulative values corresponding to each of the gain values respectively; and Step five: taking a maximum high frequency information cumulative value from the obtained high frequency information cumulative values, and using the gain value corresponding to the maximum high frequency information cumulative value in gain adjustment of illuminance for the image sensor.

According to the second aspect of the present invention, a camera is provided and configured to execute automatic gain adjustment of illuminance of illuminance by applying the method of the first aspect as afore-mentioned.

The present invention provides a method and a camera for automatic gain adjustment of illuminance based on illuminance of video content by dynamically calculating cumulative values of high frequency information of video content and processing feedback adjustment with respect to exposure gains, since the high frequency information in video images can well and comprehensively reflect richness of image content details, such approach can achieve exposure gain parameters which are more suitable for regions of interest for a user without manually focusing, thereby obtaining satisfactory exposure effect in most scenes.

BRIEF DESCRIPTION OF THE DRAWINGS

In order to more clearly explain technical solutions of embodiments in the present invention or in the prior art, the followings are some brief introductions with respect to drawings needed in the description of the embodiments or in the prior art. Obviously, the drawings described below are just some but not all embodiments of the present invention. For a person having ordinary skill in the art, obtaining other drawings from the drawings herein without paying creative labor is available.

DETAILED DESCRIPTION

In order to more clearly explain purposes, technical solutions, and advantageous of embodiments of the present invention, the following will be provided with drawings of the embodiments of the present invention, so as to clearly and completely describe the technical solutions of the embodiments of the present invention. Apparently, the described embodiments are parts of all embodiments of the present invention and do not represent all embodiments. Based on the embodiments of the present invention, all other embodiments obtained without paying creative labor by a person having ordinary skill in the art belong to claimed scope of the present invention.

Figure 1:
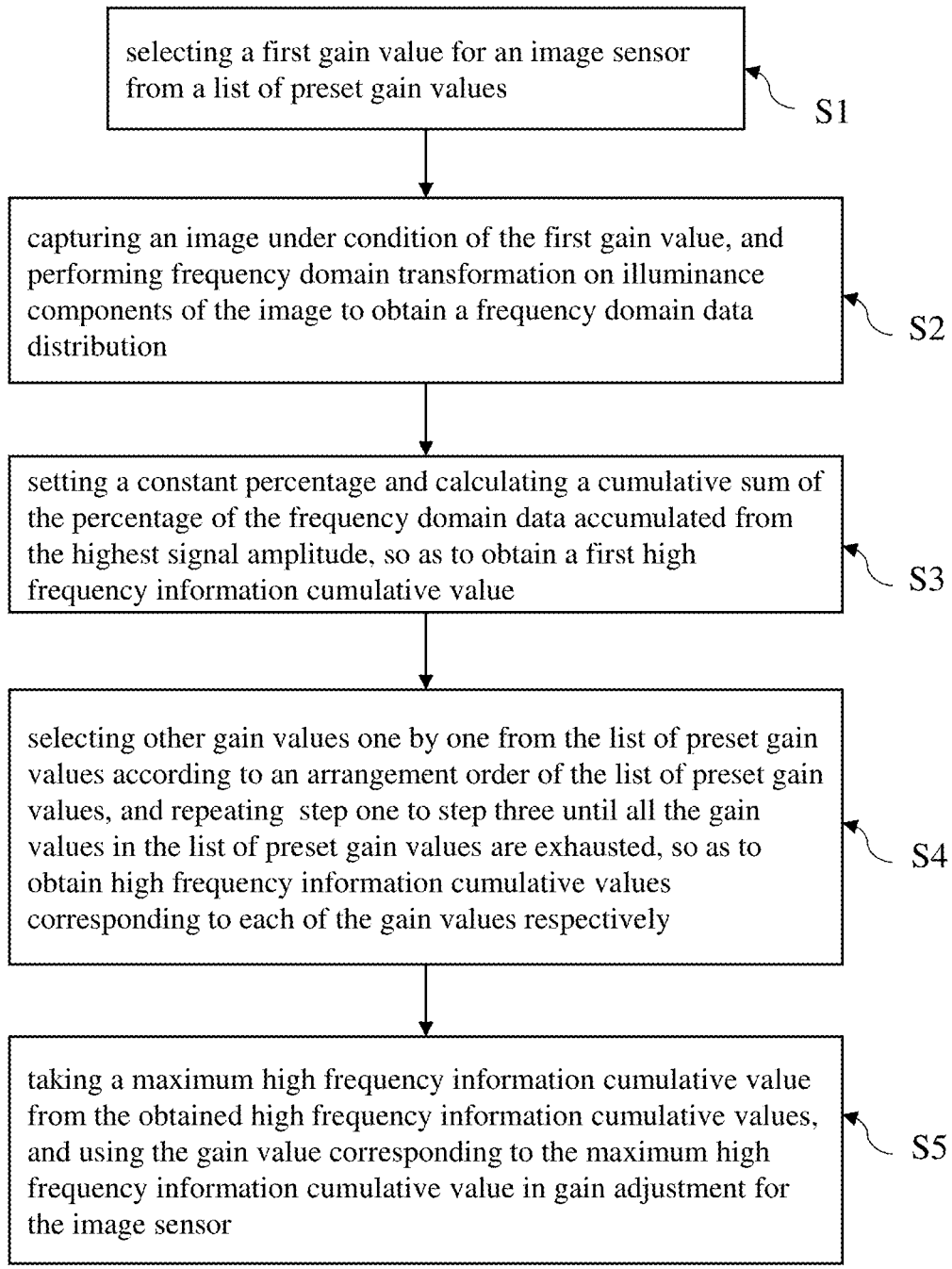
FIG. 1 is a schematic flowchart of a method for automatic gain adjustment of illuminance based on illuminance of video content according to embodiments of the present invention.

According to embodiments of the present invention, it provides a method for automatic gain adjustment based on illuminance of video content, which can be applied to a camera. As shown in FIG. 1, the method includes steps as follows:

S1: selecting a first gain value for an image sensor from a list of preset gain values;

S2: capturing an image under condition of the first gain value, and performing frequency domain transformation on illuminance components of the image to obtain a frequency domain data distribution;

S3: setting a constant percentage and calculating a cumulative sum of the percentage of the frequency domain data accumulated from the highest signal amplitude, so as to obtain a first high frequency information cumulative value;

S4: selecting other gain values one by one from the list of preset gain values according to an arrangement order of the list of preset gain values, and repeating step one to step three until all the gain values in the list of preset gain values are exhausted, so as to obtain high frequency information cumulative values corresponding to each of the gain values respectively;

S5: taking a maximum high frequency information cumulative value from the obtained high frequency information cumulative values, and using the gain value corresponding to the maximum high frequency information cumulative value in gain adjustment for the image sensor.

As afore-mentioned, the three gain adjustment approaches, namely the illuminance averaging method, the illuminance weighting method, and the illuminance histogram method cannot fulfill the requirements of exposure adjustment in camera products well. Taking smartphones or single lens reflex (SLR) cameras as examples, exposure gain adjustment needs manually focusing on an image region of interest for a user each time when the image is taken, whereas some camera products have problem of lacking user interface to facilitate users to manually focus a region of interest on screen at any time. At present, some manufacturers use artificial intelligence (AI) face recognition technology to assist cameras in automatic focusing to improve gain accuracy. However, for monitoring camera products, in addition to focusing on human faces, other focusing problems often happen when there is no human face on screen, for example, when animals appear on screen, therefore there is still room for further improvement in adaptability.

According to embodiments of the present invention, a method for automatic gain adjustment based on illuminance of video content is provided, which dynamically calculates cumulative values of high frequency information of the video content and processes feedback adjustment with respect to an exposure gain, and the high frequency information in video images can well and comprehensively reflect richness of image content details. In particular, the method may comprise: alternately configuring an image sensor with a list of preset gain values, using a same/constant percentage to filter out the same/constant proportion of the high frequency information in frequency domain data, cumulatively summing the filtered proportion of the high frequency information into high frequency information cumulative values, obtaining a number of high frequency information cumulative values matched with the number of the gain values in the present gain value list, taking a maximum high frequency information accumulation value from the obtained high frequency information accumulation values, and using the gain value corresponding to the maximum high frequency information accumulation value as an adjusted gain value for the image sensor. By this way, exposure gain parameters which are more suitable for regions of interest for a user can be achieved without manually focusing, thereby satisfactory exposure effect can be obtained in most scenes.

Optionally, the list of preset gain values may be preset by:

Dividing an available gain interval supported by an image sensor by a constant adjustment step to obtain the list of preset gain values, in which each of the gain values is listed only once.

Herein, for convenience of understanding, take a current mainstream image sensor, Sony IMX307, as an example, an available gain interval supported by this sensor is from 1 to 64 dB. If the dividing is performed using an adjustment step of 1 dB, there are 64 adjustment gain values in list of preset gain values. Similarly, if the dividing is performed using an adjustment step of 2 dB, there would be 32 adjustment values in list of preset gain values. If the dividing is performed using an adjustment step of 7 dB, there would be 10 adjustment values in list of preset gain values.

Herein, it can be understood that, within the available gain interval supported by the image sensor, it is predictable that the finer the adjustment step is, the better exposure gain value is obtained. However, considering the computational cost and burden resulted from picture convergence time of the adjustment method provided by the present invention, it is more critical to adaptively preset the gain value list according to different image sensors and in combination with requirements of camera for picture quality.

Optionally, the frequency domain transformation includes a Fourier transform.

It is well-known that frequency domain is a coordinate system used to describe frequency characteristics of signals. In the field of image processing, a Fourier transform can transform luminance components of an image into a coordinate system data. In the present invention, using other transformation methods to filter high frequency components of an image is not excluded.

Optionally, the step of setting a constant percentage value, and calculating a cumulative sum of the percentage of the frequency domain data accumulated from the highest signal amplitude, includes:

The percentage value is set as 10%, so that top 10% of the frequency domain data accumulated from the highest signal amplitude is summed up. Generally speaking, a high frequency component of an image refers to an area where intensity (illuminance/grayscale) changes sharply, which is often a so-called edge (contour). A low frequency component in an image refers to a place where image intensity (illuminance/grayscale) changes gradually, which is usually an area with a large color block. Therefore, the frequency domain data can be applied for showing which pixels belong to a major region with picture details in an image, and such region is often the region of most interest for users.

Figure 2:
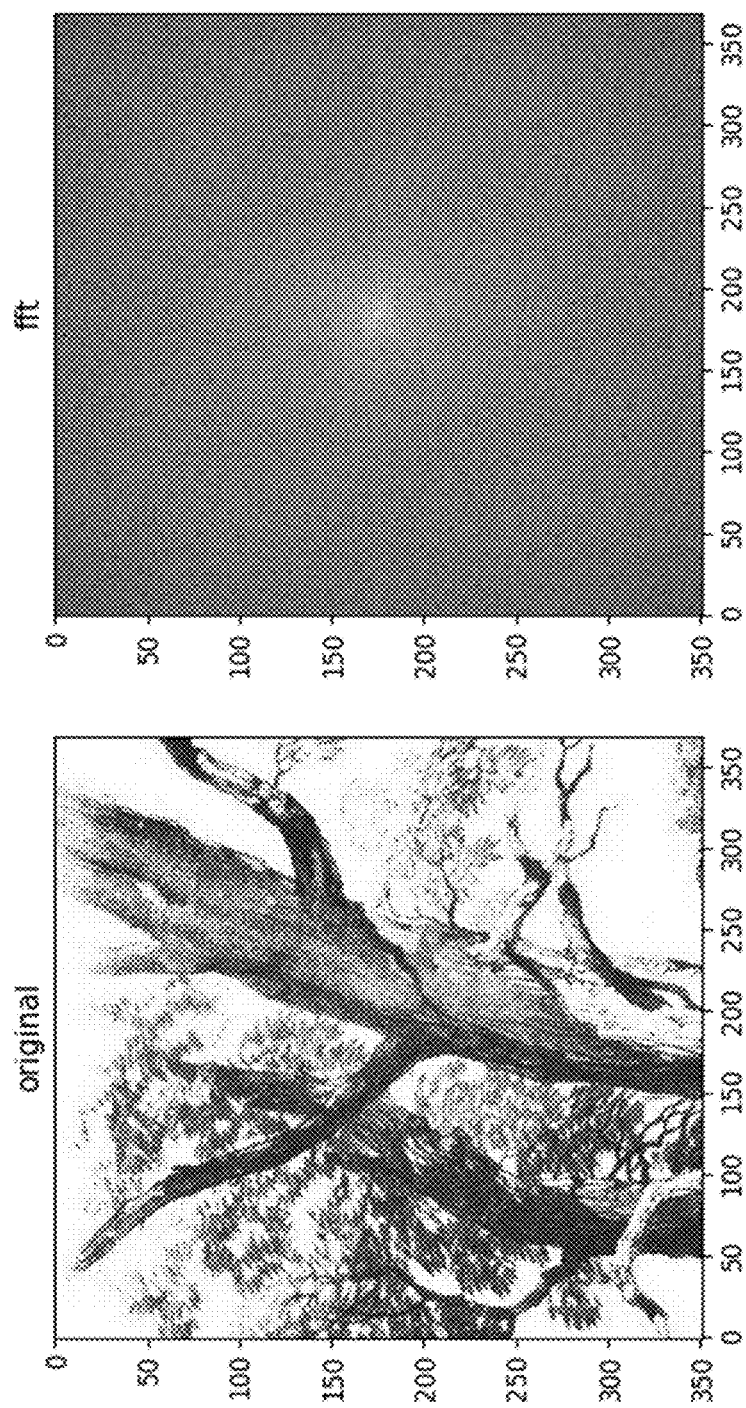
FIG. 2 is a schematic diagram of frequency domain transformation of an image in the prior art.
Figure 3:
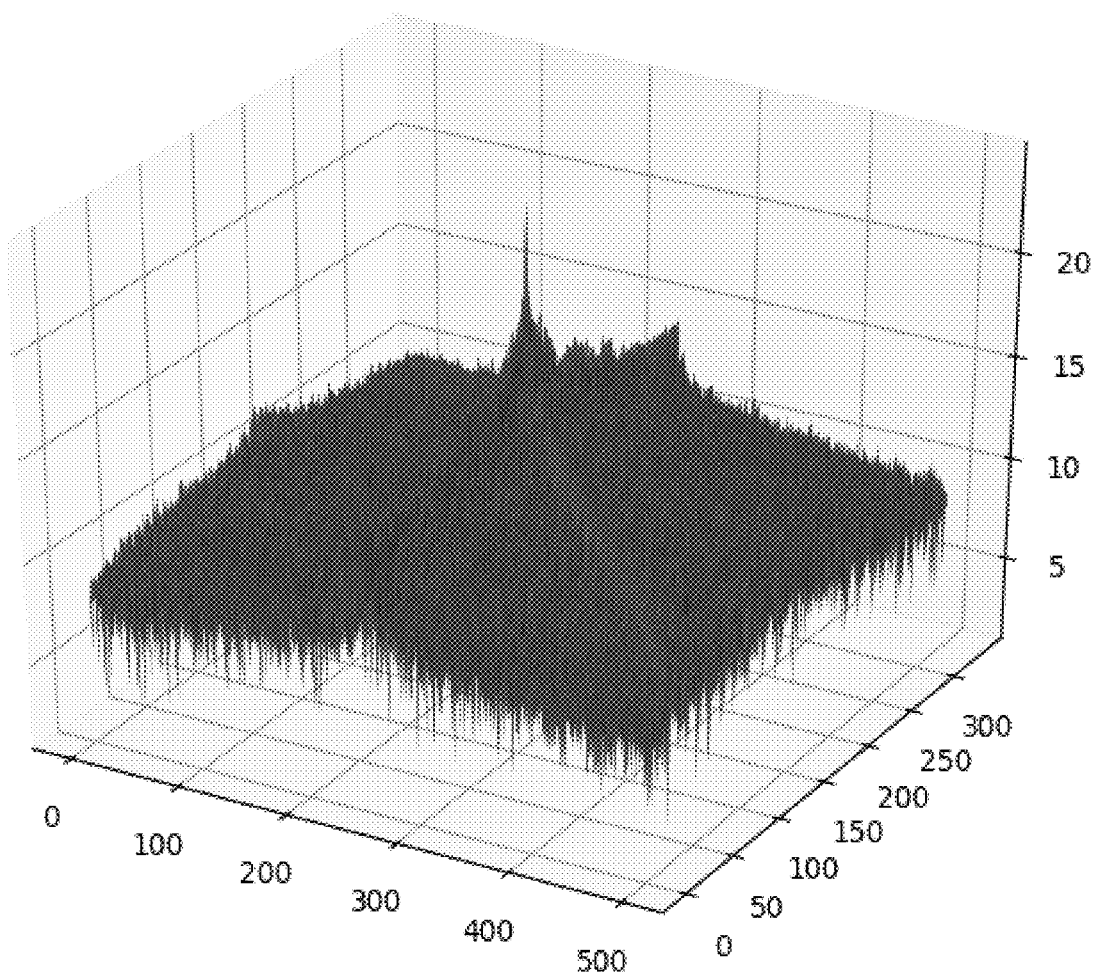
FIG. 3 is a three-dimensional schematic diagram of frequency domain signal amplitude in the prior art.

As shown in FIG. 2, it is a schematic diagram of frequency domain transformation of an image in the prior art, in which the left side is an original image and the right side is a frequency domain signal numerical matrix obtained by using frequency domain transformation. Herein, it should be noted that it is impossible to characterize frequency domain signal amplitude of each pixel or macroblock in a two-dimensional coordinate system. As shown in FIG. 3, which is a three-dimensional schematic diagram of frequency domain signal amplitude in the prior art, after an image is transformed into frequency domain, the frequency domain signal amplitude of each pixel or macroblock of the image can be represented in the three-dimensional coordinate system. Herein, it should be noted that the frequency domain signal amplitude as shown in the Z-axis in FIG. 3 is a relative value rather than an absolute value, and hence it is unnecessary to use corresponding unit to characterize the same.

If the percentage value is set as 10%, the top 10% high frequency signal components in the whole frequency domain coordinate system of the frame of the image will be filtered out. Taking an image with a 1960*1080P frame as an example, if the high frequency information is filtered in terms of pixel levels and the total number of pixels is 2116800, and then the signal values of top 211680 number (10%) of the pixels accumulated from the highest signal amplitude in the frequency domain are summed. Furthermore, the image can be also divided into a certain number of macroblocks before filtering the high-frequency information. For example, a 1960*1080P image frame may be divided into 196*108=21168 number of macroblocks, and signal values of 2117 number of the high frequency macroblocks are selected for summing up, so as to obtain the cumulative value of the high frequency information. The details of related algorithms are not repeated herein.

Moreover, herein, it should also be further noted that 10% is only an empirical value obtained through multiple experiments at present, and it is not necessary the only proportional value for obtaining the best filtering of high frequency component. The embodiments provided by the present invention are not exclusive of any possibility for obtaining better filtering effect using other percentage values.

Optionally, according to embodiments of the present invention, a method for automatic gain adjustment based on illuminance of video content is provided, in which the arrangement of the list of preset gain values is in:

a random order;

in ascending order;

in descending order; or an order configured by setting a default gain value of an image sensor as a starting point, arranging each of remaining gain values in ascending order of absolute values of difference of each of the remaining gain values from the default gain value.

Similarly, taking IMX307 sensor as an example, which supports a gain value interval of 1-64 dB. For ease of description, it is assumed that 7 dB is used as an adjustment step for dividing, such that there are 10 number of gain adjustment values in an obtained gain value list, including 1 dB, 8 dB, 15 dB, 22 dB, 29 dB, 36 dB, 43 db, 50 dB, 57 dB and 64 dB, respectively. At this time, in order to facilitate the image sensor to use and exhaust the 10 gain adjustment values, it is necessary to set an arrangement order for the 10 gain adjustment values, in which can be random, ascending, descending, or an order configured by taking a default gain value of the image sensor as a starting point and rotating (i.e. alternately arranging) the other gain values in ascending or descending order of the differences of each of the other gain values from the default gain value (which severs as the starting point).

Optionally, according to embodiments of the present invention, a method for automatic gain adjustment based on illuminance of video content is provided and applied to an image sensor in a camera, in which the automatic gain adjustment of illuminance is activated when the image sensor of the camera is activated.

Optionally, according to embodiments of the present invention, a method for automatic gain adjustment based on illuminance of video content is provided and applied to an illuminance sensor in a camera, in which the automatic gain adjustment of illuminance is activated when the illuminance sensor in the camera detects an ambient light intensity change exceeding a preset value.

Optionally, according to embodiments of the present invention, a method for automatic gain adjustment based on illuminance of video content is provided and applied to a camera, in which the automatic gain adjustment of illuminance is executed periodically during operation of the camera.

Similar to the afore-said presetting of the gain value list in the previous embodiment, theoretically, without considering hardware burden and convergence time, a camera can perform the method provided in the afore-said embodiments in an infinite loop, such that the camera can dynamically provide a very effective and appropriate exposure gain. On the other hand, as considering the problems of hardware overhead and convergence time, the method for automatic gain adjustment based on illuminance of video content provided by the afore-said embodiments may be started to operate at an initial stage of startup of an image sensor or when ambient light intensity changes greatly. Alternatively, the camera can periodically perform the gain adjustment method for a certain preset period of time while the camera is in a condition of continuous operations.

In embodiments of the present invention, a camera is provided, which is applied with the method provided by the previous embodiments to perform automatic gain adjustment of illuminance.

Although many terms such as illuminance, frequency domain, gain, and value are used in the present disclosure, the possibility of using other terms is not excluded. The reason for using these terms is just for describing and explaining the essence of the present invention more conveniently; and hence it is contrary to the spirit of the present invention to interpret them as any additional limitation.

Finally, it should be noted that: the above embodiments are only for illustrating the technical solutions of the present invention but not for limiting the same; although the present invention has been described in details with reference to the afore-described embodiments, those skilled in the art should understand that they can still modify the technical solutions recited in the afore-described embodiments, or equivalently substitute some or all of the technical features; and these modifications or substitutions do not make the essence of the corresponding technical solutions depart from the scope of the technical solutions of each of the embodiments of the present invention.

What is claimed is:

1. A method for automatic gain adjustment based on illuminance of video content, which is applicable to a camera, the method comprising:

step one: setting a first gain value for an image sensor according to a list of preset gain values;

step two: capturing an image under condition of the first gain value and performing frequency domain transformation on illuminance components of the image to obtain a frequency domain data distribution;

step three: setting a constant percentage and calculating a cumulative sum of the percentage of the frequency domain data accumulated from the highest signal amplitude so as to obtain a first high frequency information cumulative value;

step four: selecting other gain values one by one from the list of preset gain values according to an arrangement order of the list of preset gain values, and repeating the step one to the step three until all the gain values in the list of preset gain values are exhausted, so as to obtain high frequency information cumulative values corresponding to each of the gain values respectively; and step five: taking a maximum high frequency information cumulative value from the obtained high frequency information cumulative values, and using the gain value corresponding to the maximum high frequency information cumulative value in gain adjustment of illuminance for the image sensor.

2. The method of claim 1, wherein the step one further comprises presetting the list of preset gain values by dividing an available gain interval supported by an image sensor with a constant adjustment step to obtain the list of preset gain values, in which each of the gain values is listed only once.

3. The method of claim 1, wherein the frequency domain transformation in the step two comprises a Fourier transform.

4. The method of claim 1, wherein the step three further includes:

setting the percentage as 10%; and summing up the top 10% of the frequency domain data accumulated from the highest signal amplitude.

5. The method of claim 1, wherein the arrangement order of the list of preset gain values is in:

a random arrangement;

an ascending order;

a descending order; or an order configured by setting a default gain value of an image sensor as a starting point and arranging remaining gain values in ascending order of absolute values of differences of each of the remaining gain values from the default gain value.

6. The method of claim 1, wherein the automatic gain adjustment is activated when the image sensor is activated.

7. The method of claim 1, wherein the automatic gain adjustment is activated when an illuminance sensor in the camera detects an ambient light intensity change exceeding a preset value.

8. The method of claim 1, wherein the automatic gain adjustment of illuminance is executed periodically during operation of the camera.

* * * * *